INVENTOR.
JOSEPH A. WEISBECKER
BY Robert K. Youtie
ATTORNEY.

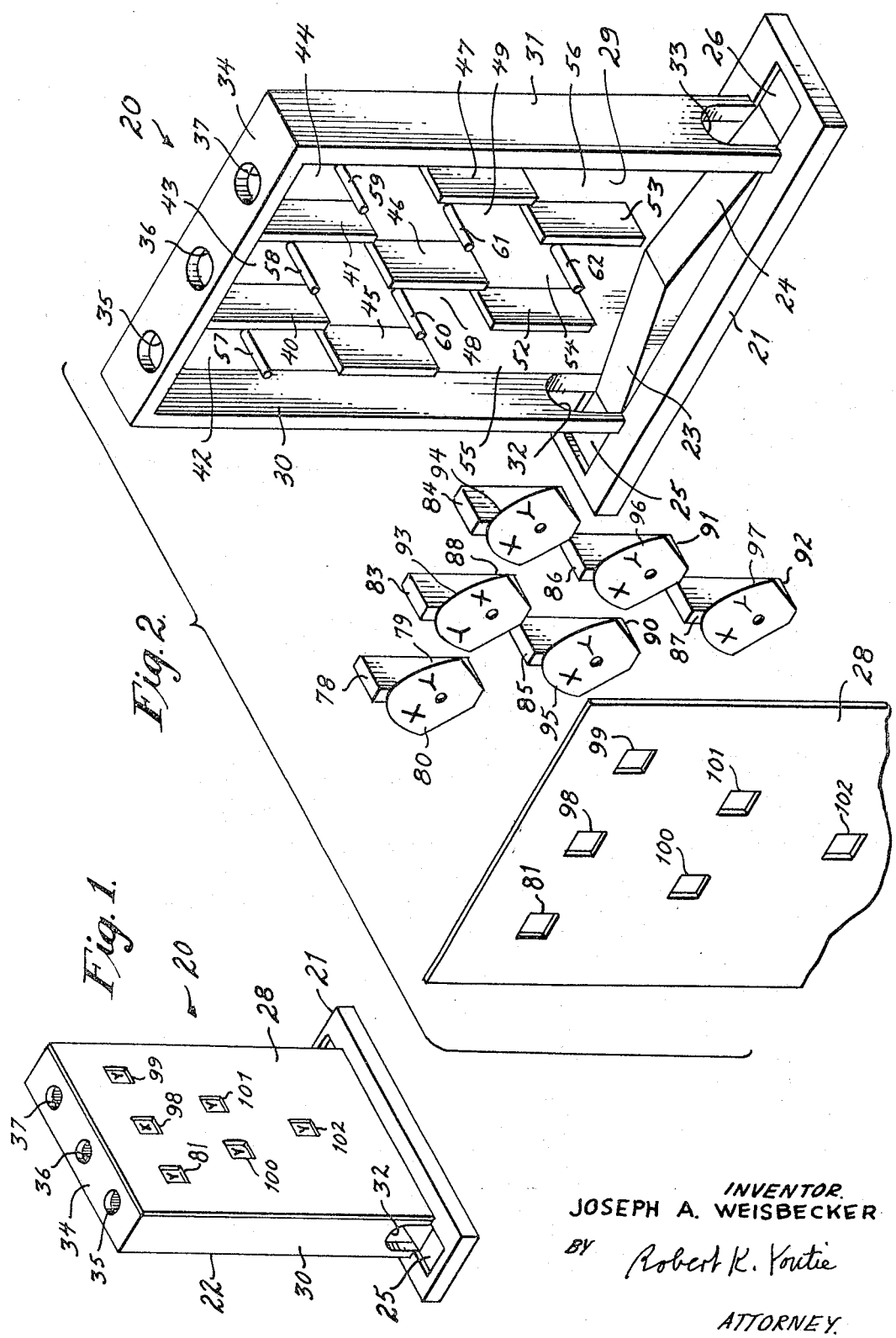

United States Patent Office 3,331,143
Patented July 18, 1967

3,331,143
COMPUTER-TYPE DEVICE
Joseph A. Weisbecker, 1220 Wayne Ave., Erlton,
Cherry Hill, N.J. 08034
Filed June 8, 1965, Ser. No. 462,349
9 Claims. (Cl. 35—30)

ABSTRACT OF THE DISCLOSURE

This invention is essentially concerned with a computer-type device, as for education or amusement, wherein a ball, check or the like is inserted into a receiver having a pair of paths, and passes through a particular path corresponding to the open position of a direction element in the receiver, and thence passes into a secondary receiver corresponding to the open path through the initial receiver, for subsequent passage through the secondary receiver along a path determined by the position of a directional element in the secondary receiver.

---

This invention relates generally to a unique mechanism in the nature of a computer for use as a toy, game, puzzle, educational device or computer.

It is an important object of the present invention to provide a device of the type described which is extremely simple in construction, capable of visible operation for educational purposes, foolproof and reliable in use, and which can be economically manufactured for sale at a reasonable price.

It is a further object of the present invention to provide a device having the advantageous characteristics mentioned in the preceding paragraph which is adapted for use as a game or toy in acordance with various rules of play, can be employed as an educational device, say to illustrate computer operation and logical techniques, and which may further be employed as a simple binary computer.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a perspective view illustrating a device constructed in accordance with the teachings of the present invention;

FIGURE 2 is an exploded perspective view of the components of the device of FIGURE 1;

Figures 3, 4:
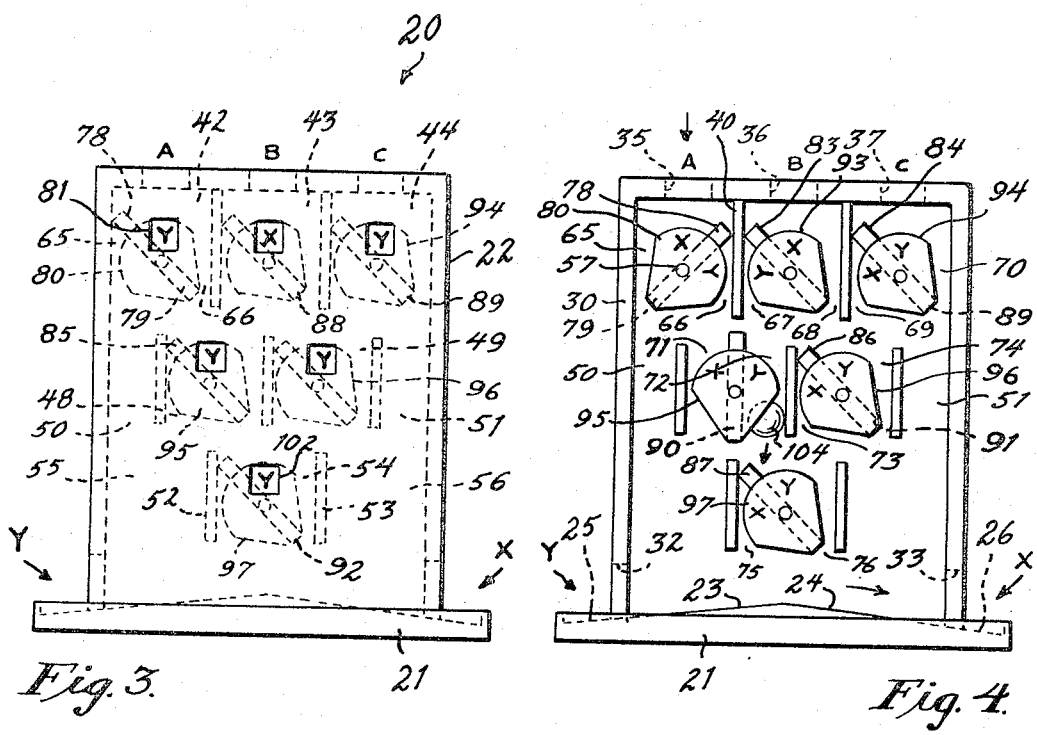
FIGURE 3 is a front elevational view of the device of FIGURE 1, showing in dashed outline the internal construction in an initial or preprogrammed state.
FIGURE 4 is a view similar to FIGURE 3, but with the front wall removed, and illustrating an intermediate condition of use.

Referring now more particularly to the drawings, and specifically to FIGURES 1-3 thereof, the device is there generally designated 20 and includes a base 21 adapted to rest on a suitable supporting surface, and a housing or enclosure 22 upstanding from the base. The base 21 may be provided with a pair of oppositely extending ramps 23 and 24 declining away from each other and terminating in respective recesses 25 and 26.

The enclosure or housing 22 may include generally parallel spaced, upstanding front and rear walls 28 and 29 on opposite sides of the laterally extending ramps 23, 24. That is, the front wall 28 is in front of the ramps 23 and 24, and the rear wall 29 is in back of the ramps 23 and 24. Generally vertical side walls 30 and 31 extend between the front and rear walls 28 and 29, the side wall 30 extending over the lower region of ramp 23, and the side wall 31 over the lower region of ramp 24. Thus, the side walls 30 and 31 extend forwardly and rearwardly between the front and rear walls 28 and 29, and the side wall 30 is provided with an opening or outlet 32 at its lower end so as to bridge the ramp 23, while the side wall 31 is provided at its lower end with an opening or outlet 33 so as to bridge the ramp 24. A top wall 34 extends across the upper ends of the front and back walls 28 and 29, and side walls 30 and 31, so as to cover the space between the front, back and side walls. A series or row of openings 35, 36 and 37 may be provided through the top wall 34 for communication with the interior of the closure 22 at laterally spaced locations thereacross.

Interiorly of the enclosure 22, say on the rear wall 29, there may be provided a pair of dividers or barriers 40 and 41 in laterally spaced relationship, the former depending vertically between the openings 35 and 36, and the latter depending vertically between the openings 36 and 37. The divider or barrier 40 combines with the adjacent side wall 30 to define of the region therebetween a cell or receiver 42, while the barriers 40 and 41 combine to define in the space therebetween a cell or receiver 43, and the barier or divider 41 combines with its adjacent side wall 31 to define therebetween a cell or receiver 44. The cells or receivers 42, 43 and 44 are disposed in side-by-side relationship laterally across the interior of the housing 22 and open upwardly through the holes 35, 36 and 37, respectively. The lower ends of the serveral cells 42, 43 and 44 open downwardly into the interior of the housing 22.

Just below the upper or initial lateral row or series of cells 42, 43 and 44 there are provided interiorly of the housing 22 and additional or secondary series of laterally spaced barriers or dividers 45, 46 and 47. The barriers or dividers 45–47 may each extend generally vertically, and be fixed to the rear wall 29, or otherwise suitably secured in position. Specifically, the divider or barrier 45 extends vertically in laterally medially spaced relation between the adjacent side wall 30 and vertical plane of the divider 40, while the barrier or divider 46 extends vertically in laterally medially spaced relation between the vertical planes of dividers 40 and 41, and the barrier or divider 47 extends vertically in laterally medially spaced relation between the vertical plane of barrier 41 and adjacent side wall 31. The regions between each adjacent pair of dividers or barriers 45–47 define cells or receivers the region between barriers 45 and 46 defining cell or receiver 48, and the region between barriers 46 and 47 defining cell or receiver 49. The cells or receivers 48 and 49 open vertically upwardly and downwardly. In addition, the region between side wall 30 and adjacent barrier 45 defines a generally vertically upwardly and downwardly opening path 50, while the region between barrier 47 and side wall 31 defines a vertically upwardly and downwardly opening path 51.

In addition, a plurality of tertiary barriers or dividers 52 and 53 are arranged in vertically extending, laterally spaced relation below the cells or receivers 48 and 49. More specifically, the barriers or dividers 52 and 53 may be carried by the rear wall 29, or otherwise suitably fixed in position, the barrier 52 extending vertically in laterally medially spaced relation between the planes of barriers 45 and 46, and the barrier 53 extending vertically in laterally medially spaced relation between the vertical planes of barriers 46 and 47. The region between barriers 52 and 53 thus defines a vertically upwardly and downwardly opening receiver or cell 54, while the region between side wall 30 and barrier 52 defines a vertically upwardly and downwardly opening path 55, and the region between barrier 53 and side wall 31 defines a vertically upwardly and downwardly opening path 56. The paths 55 and 56 and cell 54 open downwardly to the lower end of the enclosure 20.

Projecting generally horizontally forwardly and rearwardly in each cell 42–44, 48, 49 and 54 is a pin or pivot, which may be fixed to the rear wall 29 and located laterally medially of the respective cell. In particular, the cell 42 is provided laterally medially with a forwardly and rearwardly extending pivot 57, and the cells 43, 44, 48, 49 and 54 are similarly provided with forwardly and rearwardly, laterally medially located pivots or pins 58, 59, 60, 61 and 62. The pivots 57–62 each subdivide their respective cells into a pair of vertically extending, upwardly and downwardly opening paths. More specifically, the pivot 57 subdivides the cell 42 into side-by-side vertically extending, upwardly and downwardly opening paths 65 and 66. The cell 43 is similarly subdivided into paths 67 and 68, the cell 44 being subdivided into similar paths 69 and 70, the cell 48 being similarly subdivided into paths 71 and 72, the cell 49 being similarly subdivided into paths 73 and 74, and the cell 54 being similarly subdivided into paths 75 and 76.

Located in each of the cells 42–44, 48, 49 and 54, and mounted therein on the respective pivot 57–62 for rotary oscillation thereabout, is a directional member, closure or obstruction, as at 78 in cell 42. That is, the directional member, closure or obstruction 78 is pivotally carried on the pin 57 and extends generally upwardly therefrom, being of a length for swinging movement about the pin 57 into alternate engagement with opposite sides of the respective receiver or cell, as defined by side wall 30 and barrier 40. For example, in FIGURE 3 the directional element 78 has been swung leftward to a stable inclined position resting against the side wall 30, while in FIGURE 4 the directional element 78 has been swung rightward to a gravitationally stable inclined position resting against the barrier 40. In the condition of FIGURE 3 the directional element obstructs path 65 and directs gravitational movement of a pellet dropped through hole 35 toward path 66. Conversely, in the condition of FIGURE 4 directional element 78 obstructs path 66 and directs gravitational movement of a pellet dropped through hole 35 toward path 65. An operating member or arm 79 may extend from pivot 57, rigidly with directional element 78 and diametrically oppositely thereto. The operating member or arm 79 thus swings into path 66 when directional element 78 obstructs path 65. However, the operating member 79 does not close path 66 but is located therein for engagement by a falling pellet to be swung out of the path of pellet movement for swinging the associated directional element 78 from the position of FIGURE 3 to that of FIGURE 4.

Also carried by the directional element 78 may be an indicator member 80, in the nature of a flat plate normal to the pivot 57 and in adjacent facing relation with the inner side of front wall 28. The indicator member 80 may be provided with indicia, as at X and Y for indicating through the front wall 28 the particular stable position of the directional element 78. That is, the front wall 28 is provided with a thru aperture 81 affording visual access to a single one of the indicia X or Y corresponding to the position of direction element 78.

Each of the pivot pins 58–62 is similarly provided with a swingable directional element, as at 83, 84, 85, 86 and 87, respectively. The directional elements, closures or obstructions 83–87 are each swingable between a pair of gravitationally stable conditions extending in upward relation from the respective pivotal support and inclined toward and resting on one of the side barriers or walls of the respective cell. Further, an operating member or arm may extend from each pivot 58–62, as at 88, 89, 90, 91 and 92, each rigid with its adjacent respective directional element 83–87 and extending diametrically oppositely therefrom. The arms or operating members 88–92 may terminate short of the adjacent cell side so as to be of lighter weight than the associated directional element for gravitational stability of the latter in the hereinbefore described two inclined positions.

Also, each of the pivots 58–62 may be provided with an indicator member or sheet normal to the respective pivot, as at 93–97, respectively, which indicator members are fixed relative to their adjacent directional elements for rotative oscillation therewith. The indicator members 93–97 are each provided with a pair of indicia, as at X and Y on the forward side thereof for alternate exposure through front-wall openings 98, 99, 100, 101 and 102, respectively. Of course, other suitable indicia may be employed, if desired.

In use, the device 20 may be programmed, as by setting each of the directional elements 78 and 83–87 in a desired initial stable state or position. One such initial setting may be obtained by tilting the entire assembly 20 to the left, which will result in the initial state shown in FIGURE 3. A marble or other check may then be deposited in one of the holes 35–37 for movement downward through the various paths to one of the ramps 23 and 24. The gravitational check movement is predictable, dependent upon the initial state of the several directional elements and location of depositing the check. Further, the resultant state of the several cells 42–44, 48, 49 and 52 is predictable and would be indicated by the indicia exposed through front-wall openings 81 and 98–102. By way of example, a marble or check 104, see FIGURE 4, has been deposited in hole 35, passing downward through path 66 of cell 42, and is illustrated as passing downward through path 72 of cell 48. The marble 104 will then predictably pass through path 76 of cell 54 and down ramp 24 to recess 26. This downward passage of the check 104 effects a change in state of each cell through which it passes, as by switching the directional element of the respective cell to its other stable condition. The several directional elements 78 and 83–87 thus function in the manner of flip-flop valves.

Obviously, various games may be devised for use of the above-described mechanism, which may involve the concepts of bit storage, logic, switching systems, etc.

Figure 6:
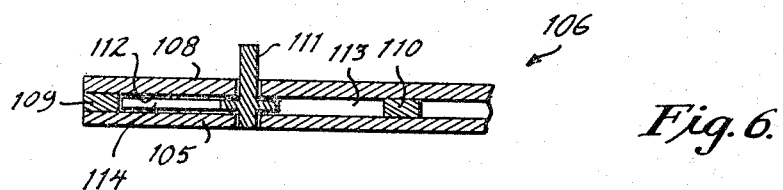
FIGURE 6 is a sectional view taken generally along the line 6—6 of FIGURE 5.
Figure 5:
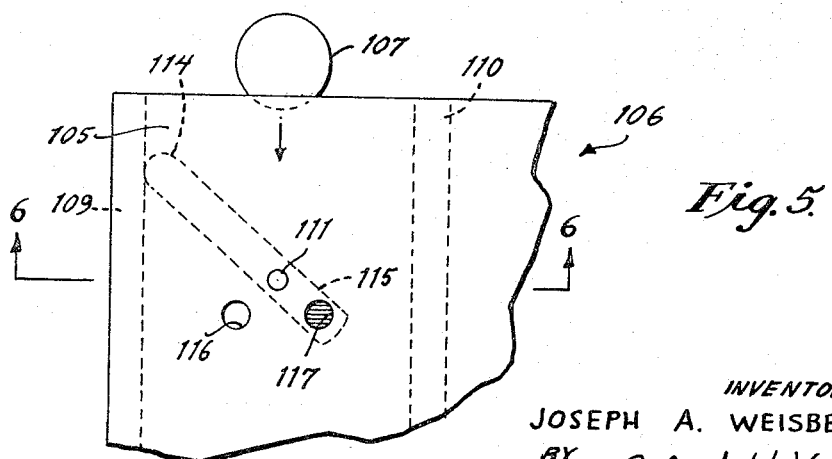
FIGURE 5 is a front elevational view showing a slightly modified embodiment of a single cell constructed in accordance wtih the teachings of the present invention.

While the structure described above in connection with FIGURES 1–4 has been illustrated in connection with a pellet or marble as a gravitationally moving check, it is appreciated that other types of checks may also be employed. For example, in FIGURES 5 and 6 is shown a single receiver or cell 106 for use with a coin or disc 107 as a check. The cell 106 may include generally upstanding, parallel spaced front and back walls 105 and 108 separated by and secured to side walls or barriers 109 and 110. The side barriers 109 and 110 may be of a thickness corresponding to or slightly greater than that of a coin or disc 107 so as to provide the cell with an internal dimension just suitable for gravitationally passing the check. The upper and lower ends of the cell are open, and a pivot pin 111 extends forwardly and rearwardly through a laterally medial location of the cell 106, between the front and rear walls 105 and 108, to subdivide the cell into a pair of vertical, upwardly and downwardly opening, side-by-side paths 112 and 113. Carried by the rotatable pin or pivot 111 and extending upward therefrom inclined toward one side barrier is a directional element closure or valve 114 swingable between opposite stable positions inclined toward and resting against respective side barriers 109 and 110. Thus, in the illustrated stable position, the directional element or valve 114 completely obstructs and closes the path 112, while the path 113 remains open. An operating member or arm may extend from the inner end of the directional element 114, as at 115, in diametrically opposite direction and terminating short of the adjacent side barrier. Thus, the operating member or arm 115 extends into the open path 113, in the illustrated position, for engagement by a falling check 107 to swing the directional element 114 to its other stable position. The condition of the directional element, closure or valve 114 may be indicated by any suitable means, such as a pair of thru openings 116 and 117 in the front wall 105, each adapted to expose therethrough the operating member 115 positioned therebehind.

While the first-described embodiment of FIGURES 1–4 may be inexpensively manufactured, say of plastic or other suitable material, the additional embodiment of FIGURE 6 may be even less expensive to manufacture, being capable of fabrication from die-cut cardboard, and similar inexpensive materials. Also, the integral formation, as illustrated, of pivot pin 111 with directional element 114 and operating arm 115, and the projection of the pivot pin through one of the receiver walls affords a convenient means for manually setting the individual cells.

Figure 7:
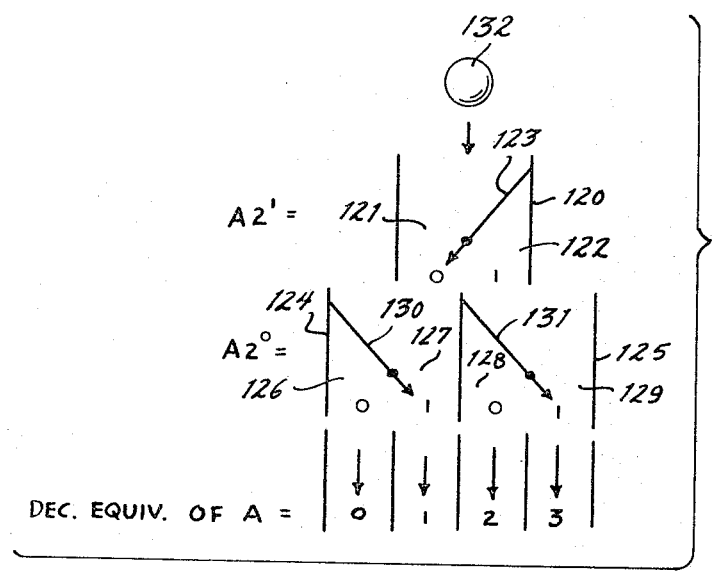
FIGURE 7 is a diagramamtic representation of the instant device illustrating a programmed arrangement for computer use in binary-to-decimal conversion.
Figure 8:
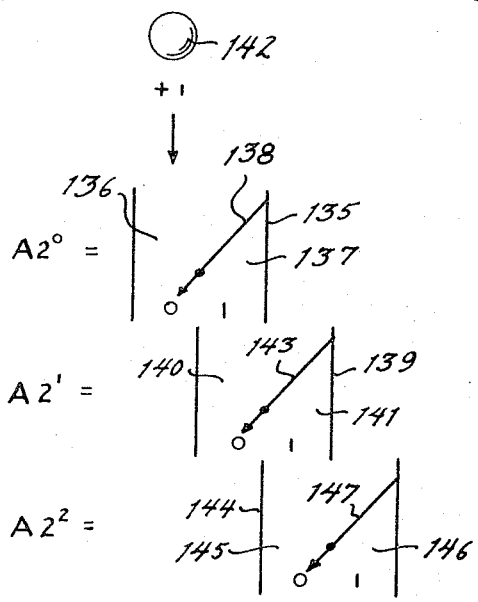
FIGURE 8 is a diagrammatic representation of a programmed arrangement for computer use as a binary counter.
Figure 9:
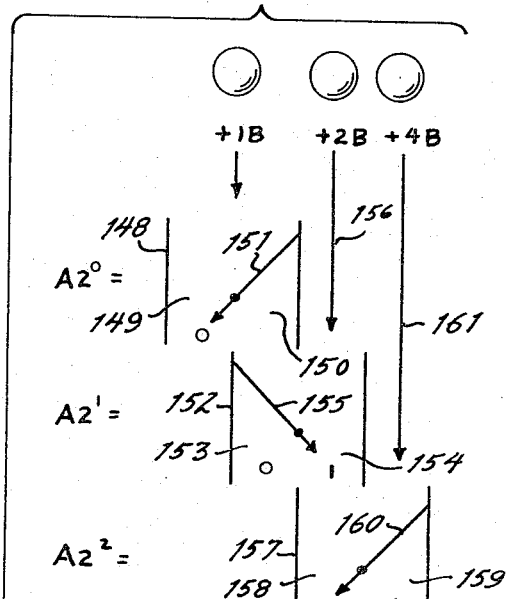
FIGURE 9 is a diagrammatic representation of a programmed arrangement for use as a binary adder.

In order to further illustrate the utilization of the instant decise as a logic trainer, reference is made to FIGURES 7, 8 and 9 as illustrating various modes of employment. For example, in FIGURE 7 is shown an initial or primary cell 120 having a pair of paths 121 and 122 and provided with a bistable directional element, obstruction or valve 123. In addition, a pair of secondary cells are respectively device as a logic trainer, reference is made to FIGURES ly designated 124 and 125, the former having a pair of thru paths 126 and 127, and the latter having a pair of thru paths 128 and 129. The cell or receiver 124 includes a bistable directional element or valve 130, and the receiver or cell 125 includes a bistable directional element 131. The secondary cell 124 is arranged to receive a check 132 in either of its paths 126 or 127 (according to the position of directional element 130) from the primary-cell path 121. The secondary cell 125 is arranged to receive a check 132 in either of its paths 128 and 129 (according to the position of directional element 131) from the primary-cell path 122. The secondary paths 126, 127, 128 and 129 pass to respective termini designated by the numerals "0," "1," "2" and "3." The two paths of each receiver may respectively correspond to the binary numbers "0" and "1," and by pointing the directional elements or valves to the desired two-bit binary number. For example, the primary directional element or valve 123 points to the "0" and the secondary directional element or valve 130 points to the "1" to program for the binary number "01." The path of movement of check 132 is through path 127 to indicate the decimal number "1" equivalent to the programmed binary number.

As a three-bit binary counter the arrangement of cells may be used as shown in FIGURE 8. A primary cell is there designated 135 having paths 136 and 137 and provided with a directional element or valve 138. A secondary cell or receiver 139 is arranged with paths 140 and 141 to receive a check 142 from the path 137 of the primary cell. A directional element or valve 143 is provided in the cell 139. An additional cell 144 includes paths 146 and 146 arranged to receive a check from path 141 of cell 139, and includes a directional element or valve 147. It will be apparent from study of this arrangement that a three-bit binary number is increased by one each time the check is dropped.

In order to function as a three-bit binary adder, an arrangement of cells may be employed as shown in FIGURE 9. An initial or primary cell is there designated 148 having paths 149 and 150 and a bistable directional element or valve 151. A secondary cell or receiver 152 includes paths 153 and 154, and a bistable directional element or valve 155. The cell 152 is arranged to receive in either of its paths 153 and 154 (dependent upon the state of directional element 155) a check from the path 150 of cell 148. The cell 152 is also arranged to receive a check from an additional path 156 by-passing the cell 148. A further or tertiary cell or receiver 157 includes paths 158 and 159 located to receive a check from path 154. The cell 157 includes a directional element or valve 160, and is also located to receive a check from an additional path 161 by-passing both cells 148 and 152. As indicated, the left and right paths of each cell are respectively designated "0" and "1." As illustrated, the pointers of cells 148, 152 and 157 are arranged to indicate the binary number "010." If it is desired to add to this the binary number "101" a ball will first be dropped into the primary receiver or cell 148, the dropping of a ball or check into the second receiver or cell 152 along path 156 will be omitted, and a ball will be dropped into the third receiver or cell 157 along path 161. The sum will thus be indicated as the binary number "111."

From the foregoing, it is seen that the present invention provides a computer-type device which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A computer-type device comprising at least one initial receiver for receiving a check and having a pair of generally parallel alternate paths for movement therealong of a received check through said receiver, a direction element mounted in said initial receiver for movement between a pair of stable positions each located in a respective path, said direction element being configured to direct each check received along each of said paths to pass through the receiver in the path in which the direction element is not positioned, operating means extending from said direction element for actuation by a passing check to move the direction element between said positions, at least one secondary receiver for receiving a check from at least one path of said initial receiver and having a pair of generally parallel alternate paths for movement therealong of each received check through said secondary receiver, a secondary direction element mounted in said secondary receiver for movement between a pair of stable positions each located in a respective path of said secondary receiver, said secondary direction element being configured to direct each check received along each of said paths of said secondary receiver to pass through the secondary receiver in the path in which the secondary direction element is not positioned, and secondary operating means extending from said secondary direction element for actuation by a passing check to move the secondary direction element between said positions.

2. A device according to claim 1, said secondary receiver having its two paths located for reception of a check from a single path of said initial receiver.

3. A device according to claim 1, said initial and secondary operating means each comprising an arm on the respective direction element extending into the path in which the direction element is not located.

4. A device according to claim 1, said direction elements each comprising a closure plate pivoted in the respective receiver for swinging movement between a pair of positions each extending obliquely across and closing one of said paths and opening the other of said paths.

5. A device according to claim 4, said operating means each comprising an arm on the respective closure plate for swinging movement therewith and extending into the open path of the respective receiver for actuation by a passing check.

6. A device according to claim 1, said initial receiver being located above said secondary receiver, and said receiver paths extending generally downward for gravitational movement therethrough of a check.

7. A device according to claim 1, in combination with a wall concealing said receivers, direction elements and operating means; said wall having a window for each receiver; and indicating means exposed through said windows and associated with each directional element for indicating position thereof.

8. A computer-type device comprising a pair of cells each having a pair of thru paths for passing a check and arranged with at least one path of one cell communicating with both paths of the other cell, valve means in each cell movable between a pair of stable positions each closing a respective path of the corresponding cell and directing each check to the other path thereof, and operating means located in each cell for shifting the valve means thereof upon passage therethrough of a check.

9. A device according to claim 8, said valve means each comprising a closure pivoted in the respective cell for swinging movement between a pair of positions extending across one of said paths and directing each check through the other of said paths, said operating means each comprising an arm on the respective closure for swinging movement therewith and extending into the open path of the respective cell for actuation by a passing check, said cells each comprising an open-ended passageway, and guide means laterally medially of said passageway subdividing the latter into a pair of paths on opposite sides of said guide means, said valve means each comprising a closure swingable from said guide means into obstructing relation alternately with each of said paths, and said operating means each comprising an arm on a respective closure extending into the nonobstructing path for actuation by a passing check.

References Cited

UNITED STATES PATENTS 3,006,082  10/1961  Libbey _____ 35—32 X
3,278,187  10/1966  Sinden _____ 273—111 X EUGENE R. CAPOZIO, *Primary Examiner.*

W. GRIEB, *Assistant Examiner.*